United States Patent [19]
Kage

[11] Patent Number: 5,513,243
[45] Date of Patent: Apr. 30, 1996

[54] PERSON LOCATION SYSTEM

[75] Inventor: Kouzou Kage, Tokyo, Japan

[73] Assignee: NEC Corporation, Tokyo, Japan

[21] Appl. No.: 364,428

[22] Filed: Dec. 27, 1994

Related U.S. Application Data

[63] Continuation of Ser. No. 4,898, Jan. 21, 1993, abandoned.

[30] Foreign Application Priority Data

Jan. 20, 1992 [JP] Japan ..................................... 4-007639
Jan. 20, 1992 [JP] Japan ..................................... 4-007640

[51] Int. Cl.$^6$ ..................................................... H04Q 7/24
[52] U.S. Cl. .............................. 379/58; 379/57; 455/56.1
[58] Field of Search ................................ 379/57, 58, 59, 379/60, 201, 210, 211, 212, 63; 455/33.1, 33.2, 33.4, 54.1, 56.1, 53.1, 54.2

[56] References Cited

U.S. PATENT DOCUMENTS

| | | | |
|---|---|---|---|
| 4,700,734 | 10/1987 | Bini | 379/60 |
| 4,752,951 | 6/1988 | Konneker | 379/211 |
| 4,907,290 | 3/1990 | Crompton | 455/54.1 |
| 4,947,420 | 8/1990 | Stahl | 379/57 |
| 4,988,991 | 1/1991 | Motegi | 379/57 |
| 5,046,130 | 9/1991 | Hall et al. | 455/54.1 |
| 5,063,588 | 11/1991 | Patsiokas et al. | 379/57 |
| 5,090,051 | 2/1992 | Muppidi et al. | 379/63 |
| 5,095,500 | 3/1992 | Tayloe et al. | 379/59 |
| 5,157,709 | 10/1992 | Ohteru | 455/56.1 |
| 5,218,716 | 6/1993 | Comroe et al. | 455/33.4 |
| 5,224,150 | 6/1993 | Neustein | 379/57 |
| 5,319,699 | 6/1994 | Kerihuel et al. | 379/60 |
| 5,327,575 | 7/1994 | Merich et al. | 455/33.2 |

FOREIGN PATENT DOCUMENTS

0203819A2 12/1986 European Pat. Off. .
0460486A1 12/1991 European Pat. Off. .

*Primary Examiner*—Curtis Kuntz
*Assistant Examiner*—William G. Trost
*Attorney, Agent, or Firm*—Foley & Lardner

[57] ABSTRACT

A person location system comprises radio base stations and a radio central station, all stations being connected to a public switched telephone network. The base stations respectively cover small areas, or "microcells", in one of which is located a user station, and the central station covers an area containing all of the microcells. The central station receives a polling signal containing the user's address via the telephone network and broadcasts a copy of the polling signal. A management center is connected to the telephone network for transmitting the polling signal to the central station when a location demand arises. Each base station is responsive to the polling signal from the central station for returning field intensity data of the user station through the telephone network to the management center if the polling signal identifies the user station.

7 Claims, 3 Drawing Sheets

USER STATION

BASE STATION

USER STATION

BASE STATION

PERSON LOCATION SYSTEM

This application is a continuation of application Ser. No. 08/004,898, filed Jan. 21, 1993, now abandoned.

BACKGROUND OF THE INVENTION

1. Field of the Invention

The present invention relates to a person location system comprising a plurality of base stations which are respectively located at the sites of microcells with radius of about 100 meters.

2. Description of the Related Art

In a proposed person location system, a plurality of radio base stations are located to serve microcells and users are always carrying a hand-held transmitter for periodically transmitting a signal identifying the user. Each base station monitors the field intensity of the transmitted signal and informs it to a management center via a dedicated network of radio or wire-line circuits. However, such a dedicated network would be complex and costly if implemented solely with dedicated wire-line circuits, or if implemented with radio circuits since a switched network would be required for routing signals from the base stations.

SUMMARY OF THE INVENTION

It is therefore an object of the present invention to provide a person location system which enables low-cost implementation.

According to a broader aspect of the present invention, there is provided a person location system which includes a plurality of radio base stations, connected to a public switched telephone network, for respectively covering microcells, in one of which is located a user station which is uniquely identified by a user's address. A radio central station is provided for covering an area containing all of the microcells. The central station is connected to the public switched telephone network for receiving a polling signal containing a user's address of the desired user station via the telephone network and broadcasting a copy of the polling signal within the area. A management center is connected to the public switched telephone network for transmitting the polling signal through the telephone network to the central station. Each of the base stations is responsive to the polling signal from the central station for returning field intensity data of the user station through the telephone network to the management center if the polling signal identifies the user station.

According to a first specific aspect of the present invention, the user station periodically measures the field intensity of a signal from each of surrounding base stations, selects one of the surrounding base stations which is transmitting a signal of highest field intensity, and transmits to the selected base station a field intensity signal containing the measured field intensities of the surrounding base stations and identifiers of the surrounding base stations. Each of the base stations receives the field intensity signal from the user station and stores the received field intensity signal, and is responsive to the polling signal broadcast from the central station for transmitting the stored field intensity signal to the management center via the telephone network as the field intensity data.

According to a second specific aspect of the present invention, each of the base stations is responsive to the polling signal from the central station for broadcasting a copy of the polling signal, and the user station periodically measures the field intensity of a signal from each of surrounding base stations, and stores the measured field intensities and identifiers of the surrounding base stations. On receiving the copy of the polling signal broadcast from the base station, the user station transmits to the base station a field intensity signal containing the stored field intensities of the surrounding base stations and the identifiers of the surrounding base stations. The base station responds to the transmitted field intensity signal from the user station by transmitting a copy of the field intensity signal to the management center via the telephone network as the field intensity data.

Advantageously, the central station is a paging station which transmits a radio paging signal to radio pagers, and each of the base stations serves mobile telephone units.

BRIEF DESCRIPTION OF THE DRAWINGS

The present invention will be described in further derail with reference to the accompanying drawings, in which.

DETAILED DESCRIPTION

Figure 1:
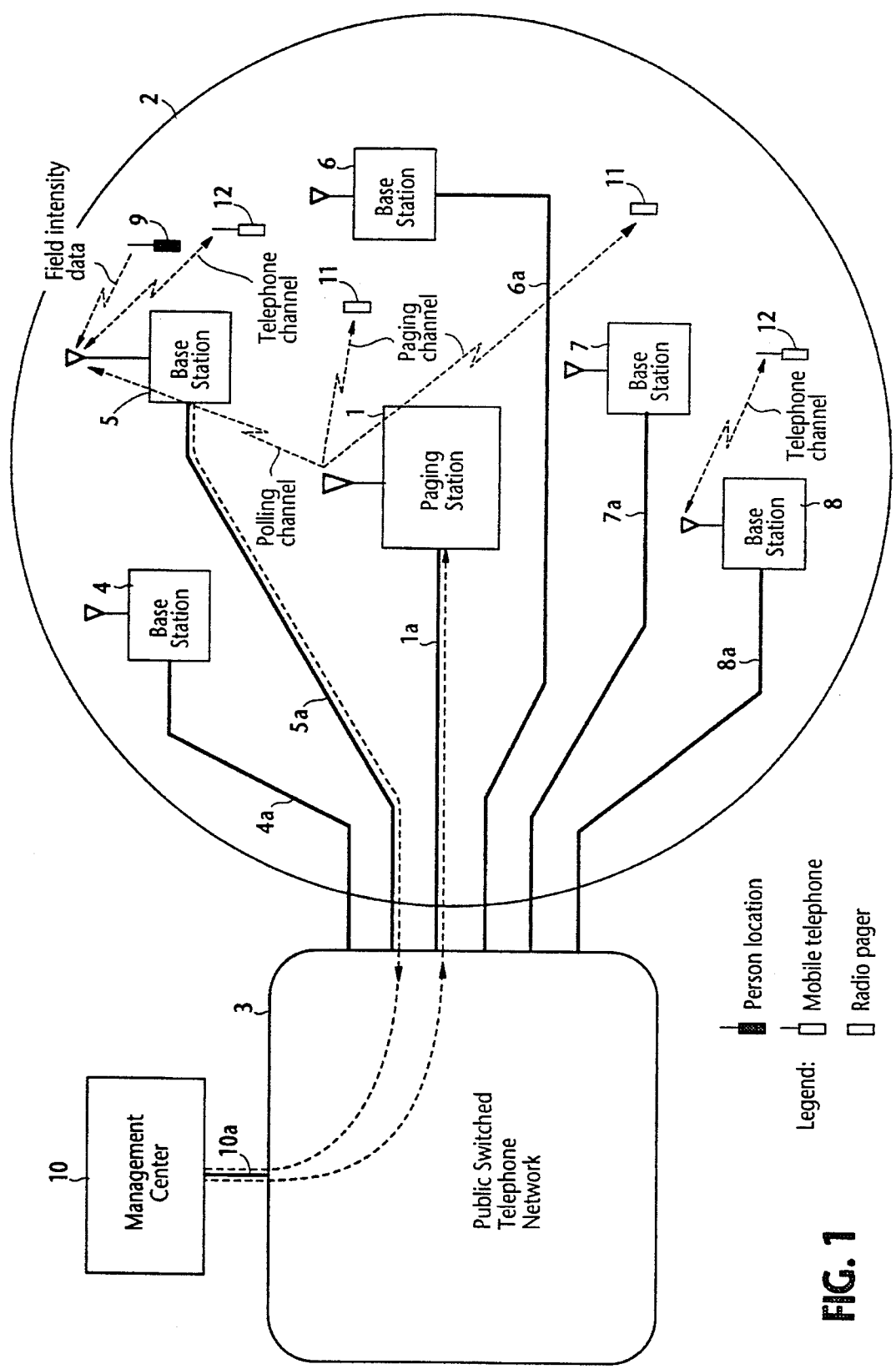
FIG. 1 is a block diagram of a person location system according to the present invention.

Referring to FIG. 1, a first embodiment of a person location system of the present invention comprises cell-site base stations 4–8 which are located in respective small zones or "microcells" each with a radius of about 100 meters. Base stations 4–8 are connected to a public switched telephone network (PSTN) 3 through respective exchange lines 4a–8a. At the center of a larger area 2 that covers all microcells of base stations 4–8 there is located a radio paging station 1, which is connected to the PSTN 3 through exchange line 1a. Each user of the system carries a hand-held radio transceiver, or user station 9, which is uniquely identified by a user's address. The user station 9 periodically scans across the spectrum of frequencies used by all the base stations, and measures the field intensity of each signal transmitted from surrounding base stations. The management center 10 transmits a polling signal containing the user address of a desired user station through the PSTN to the paging station 1 where it is broadcast. When the polling signal from the paging station is received by a base station, a copy of the polling signal is broadcast from the base station to elicit a response from the polled user station to collect the measured field intensity data, or field intensity data, which have already been received from the user station and stored in the base-station memory, are transmitted from the base station to the management center in a manner as will be described in detail below.

It is advantageous to combine the existing cellular telephone network and paging system to form the person location system of the present invention. In such instances, conventional mobile (personal) telephone units 11 and radio pagers 12 are located in the area 2 as shown in FIG. 1.

Figure 2:
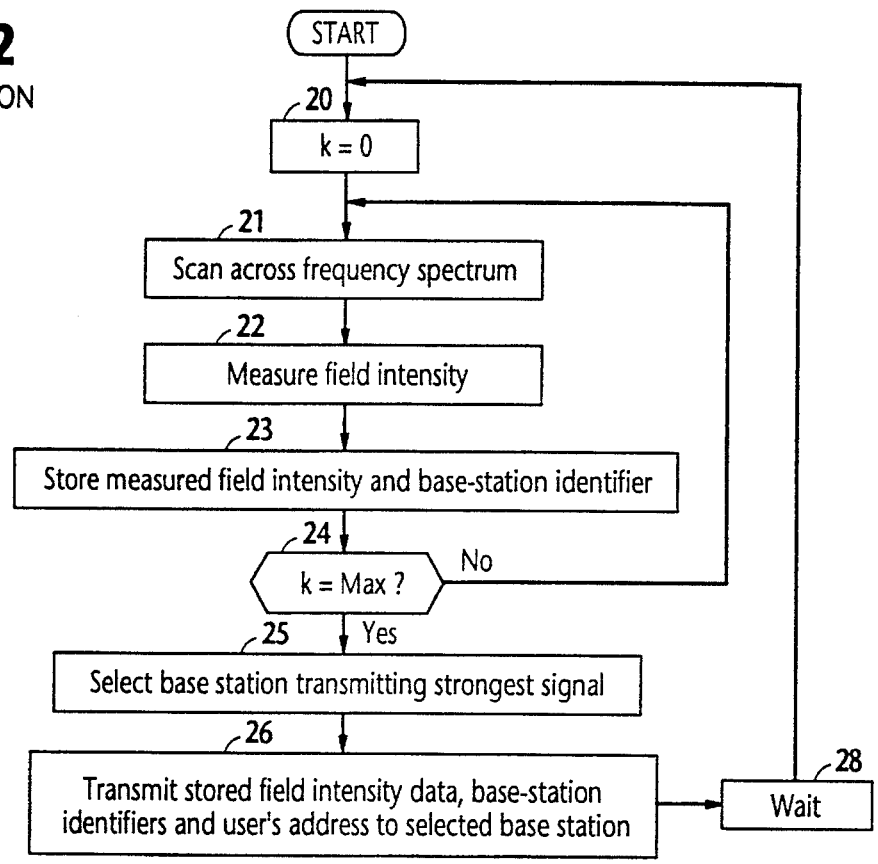
FIG. 2 is a flowchart of operations performed by the user station according to a first embodiment of the present invention.
Figure 3:
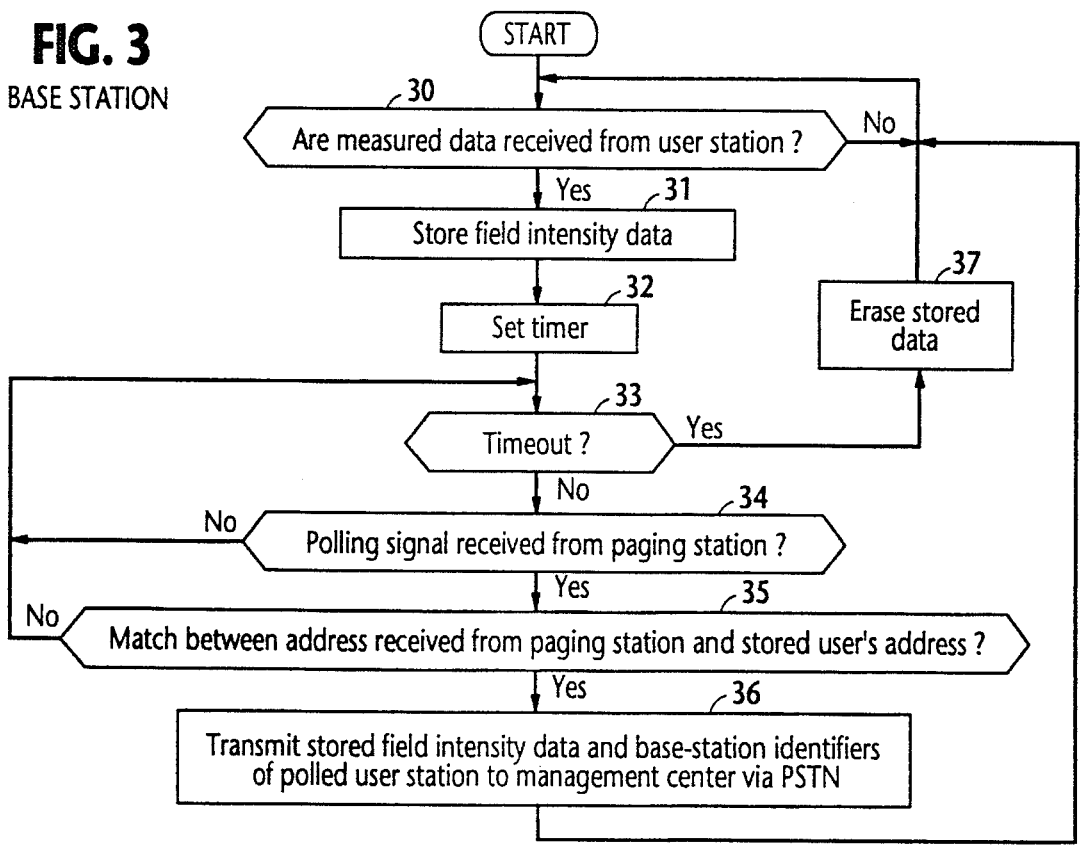
FIG. 3 is a flowchart of operations performed by the base station according to the first embodiment of the present invention.

FIGS. 2 and 3 are flowcharts of the user station and the base station, respectively, according to a first embodiment of the present invention. In FIG. 2, the program execution of the user station begins with initialization step 20 that initializes a variable k to zero. Exit then is to step 21 to cause the frequency synthesizer of the user station to scan across the spectrum of frequencies assigned to all base stations of the system and measures the field intensities of signals transmitted from nearby base stations (step 22) and receive the base-station Identifiers which are transmitted with these signals to identify the base stations surrounding the user station. The measured field intensities are stored in a memory together with the received base-station identifiers (step 23), Control then moves to step 24 to check to see if variable k is equal to a maximum value which represents the total number of radio channels allocated to the system. If the answer is negative, control returns to step 21 to repeat the process until variable k equals the maximum value. If the answer is affirmative, control branches at step 24 to step 25 to read data from the memory and selects a base station which is transmitting the signal of highest intensity. Exit then is to step 26 to transmit the stored intensity value, the base-station identifers and the address of the user station to the selected base station. Following a predetermined wait interval, control returns to step 20 to repeat the above process (step 27).

In FIG. 3, the program execution of each base station begins with decision step 30 to check for the reception of field intensity data from a use station. If there is one, control branches to step 31 to store the received field intensity data in a base-station memory together with base-station identfiers and a user's address accompanying the field intensity data. A timer is then set (step 32) and a check is made whether the timeout period set in the timer has expired (step 33). If the timeout period has expired, control branches at step 33 to step 37 to erase the stored field intensity data of the user station and returns to step 30 to repeat the process. Therefore, if the user has moved out of the boundary of a base station, the field intensity data stored in the base station together with the base-station identifiers of the user station are erased.

If the timeout period is not expired, control branches at step 33 to step 34 to determine whether a polling signal is received from the management center 10 via the PSTN. If the answer is affirmative, control branches at step 34 to step 35 to check to see if there is a match between the user's address contained in the received polling signal and a user's address stored in the base-station memory. If there is a match between the two, control proceeds to step 36 to read the stored field intensity data and base-station identifiers which have been received from the polled user station and transmit it as a response signal to the management center 10 via the PSTN. If the decision at each of steps 34 and 35 is negative, control returns to step 33 to repeat the polling signal reception process until the timeout expires. Following the transmission of the field intensity data and associated base-station identifiers to the management center, control returns to step 30 to repeat the process.

The operation of the first embodiment is as follows. If the user station 9 is located in the microcell of base station 5, as illustrated in FIG. 1, it measures and stores the field intensity of signal from this base station as well as the field intensities of signals from nearby base stations 4 and 6 at periodic intervals to make a set of records, and then selects base station 5 as one transmitting the highest intensity signal, and communicates all the records of field intensity values and base-station identifiers to base station 5 together with the address of the user station 9 to be stored in the memory of the base station .5. The stored records of user station 9 are recalled from the memory of base station 5 when the latter receives a polling signal from the management center via the paging station 1 which identifies the user station 9. A response signal containing the stored records of the user station 9 is sent from base station 5 to the management center through the PSTN. On receiving the response signal from base station 5, the management center 10 analyzes the field intensities measured at the user station 9 and determines its location.

Figure 4:
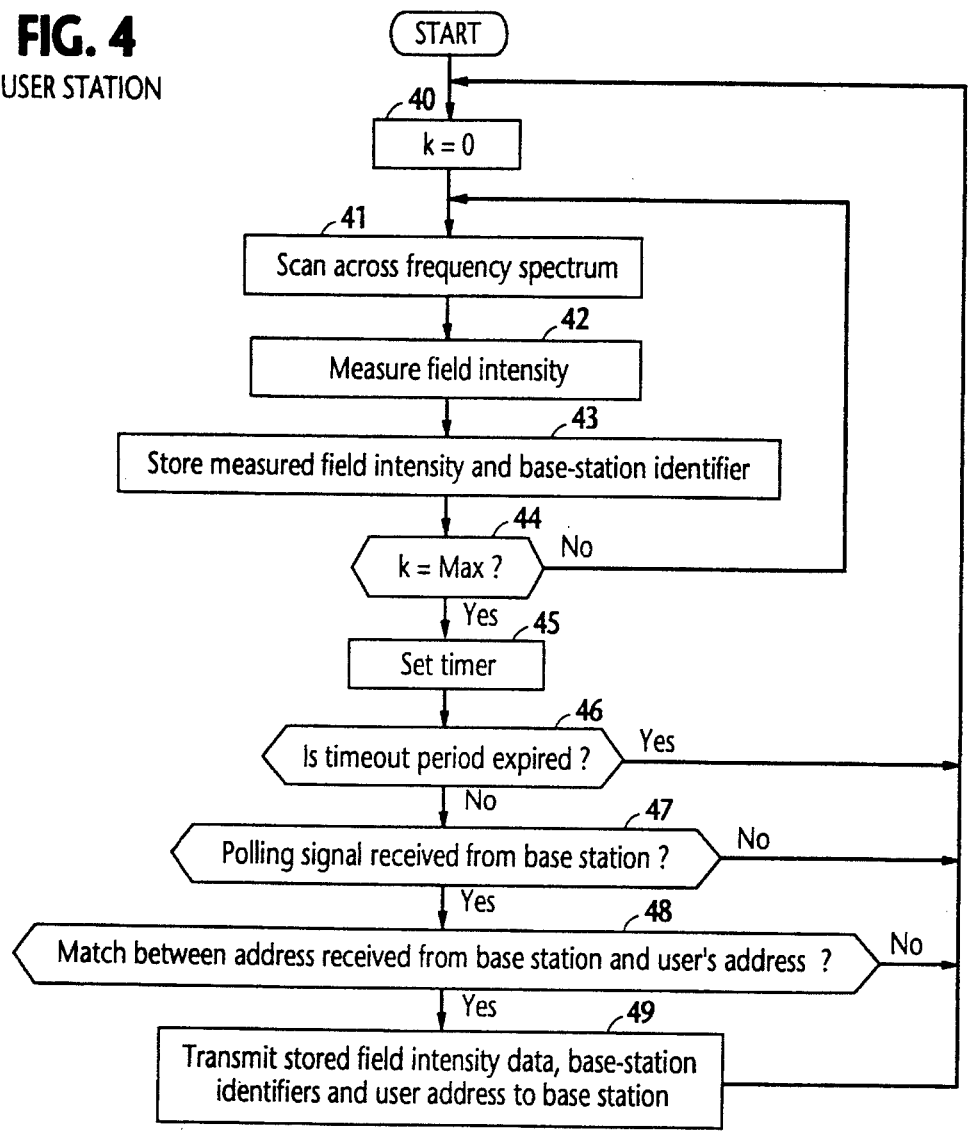
FIG. 4 is a flowchart of operations performed by the user station according to a second embodiment of the present invention.
Figure 5:
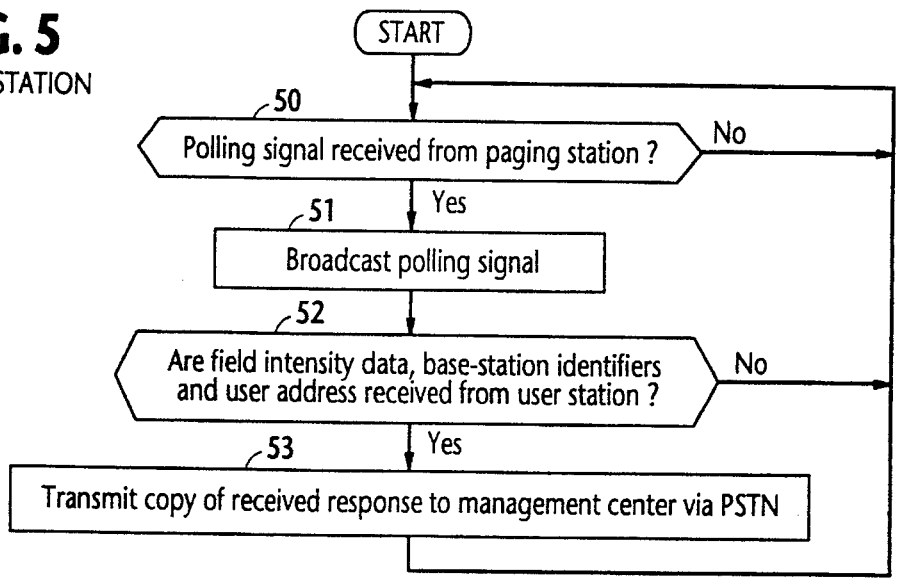
FIG. 5 is a flowchart of operations performed by the base station according to the second embodiment.

FIGS. 4 and 5 are flowcharts of the user station and the base station, respectively, of a second embodiment of the present invention. In FIG. 4, the program execution of the user station begins with initialization step 40 to initialize a variable k to zero. Exit then is to step 41 to cause the frequency synthesizer of the user station to scan across the spectrum of frequencies assigned to all base stations of the system and measures the field intensities of signals transmitted from nearby base station (step 42) and receive the base-station identifier transmitted from such stations. The measured field intensities are stored in a user-station memory together with the received base-station identifiers (step 43). The variable k is then checked (step 44) to see if it is equal to the maximum value representing the total number of radio channels allocated to the system. If the answer is negative, control returns to step 41 to repeat the process until variable k equals the maximum value. A timer is then set (step 45) and a check is made at step 46 whether the timeout period set in the timer has expired. If the timeout period has expired, control returns to step 40, otherwise it proceeds to step 47 to check to see if a polling signal is received from a base station. If this is the case, control branches at step 47 to step 48 to check the received address against the address of the user station. If there is a match between the two, control proceeds to step 49 to read field intensity data and base-station identifiers from the memory and transmits them as a response signal to the base station from which the polling signal has been received. Following the transmission of the response signal, control returns to step 40 to repeat the process.

In FIG. 5, the program execution of the base station starts with decision step 50 that checks for the reception of a polling signal from the paging station 1. If there is one, control branches at step 50 to step 51 to broadcast a copy of the polling signal to urge user stations to return a response signal. Exit then is to step 52 to check to see if a response signal containing field intensity data, base-station identifiers and a user's address is received from a user station. If the answer is affirmative, control branches to step 53 to transmit a copy of the response signal to the management center 10 via the PSTN, and returns to step 50 to repeat the process.

The operation of the second embodiment is as follows. If the user station 9 is located in the microcell of base station 5 as in the case of the first embodiment it measures and stores the field intensity of signal from this base station as well as the field intensities of signals from nearby base stations 4 and 6 at periodic intervals to make a set of records in a memory. When the management center sends a poling signal through the PSTN and through paging station 1 to base station 5, the user station 9 is polled and sends a response signal containing all the records of field intensity values and base-station identifiers to base station 5 together with the address of the user station 9. A copy of the received records of user station 9 is transmitted from base station 5 to the management center through the PSTN. On receiving the response signal from base station 5, the management center 10 analyzes the field intensities measured at the user station 9 and determines its location in a manner similar to the previous embodiment.

What is claimed is:

1. A person location system comprising:

a plurality of radio base stations, connected to a public switched telephone network, for respectively covering microcells, each of said base stations being uniquely identified by an identifier and having a memory;

a user station located in one of said microcells and uniquely identified by a user's address, said user station detecting field intensities of signals transmitted from surrounding radio base stations and transmitting a field intensity signal containing detected field intensities, identifiers of the surrounding base stations and said user's address to one of the surrounding base stations;

a radio central station for covering an area containing all of said microcells, the radio central station being connected to said public switched telephone network for receiving a polling signal containing said user's address via the public switched telephone network and broadcasting a copy of the polling signal within said area, said radio central station serving as a transmitting station of a radio paging system for transmitting said polling signal and a radio paging signal having a message for radio pagers owned by subscribers of the radio paging system; and a management center connected to said public switched telephone network for transmitting said polling signal through a switched connection established by said public switched telephone network to said central station, each of said base stations receiving the field intensity signal from said user station and storing the received field intensity signal into said memory, each of the base stations being responsive to said polling signal for notifying the field intensities and the identifiers contained in the stored field intensity signal through a switched connection established by said public switched telephone network to said management center if the user's address in said polling signal matches the user's address in said field intensity signal, said management center determining the location of said user station based on the field intensities and the identifiers notified by the base station.

2. A person location system as claimed in claim 2, wherein each of said base stations comprises means for erasing the stored field intensity signal if a prescribed timeout period expires after the reception of the field intensity signal from the user station.

3. A person location system as claimed in claim 1, wherein each of said base stations serves mobile telephone units.

4. A location system comprising:

a plurality of radio base stations, connected to a public switched telephone network, for respectively covering microcells, each of said base stations being uniquely identified by an identifier;

a user station located in one of said microcells and uniquely identified by a user's address, said user station having a memory and detecting at intervals, field intensities of signals transmitted from surrounding base stations and storing the detected field intensities into said memory and being responsive to a polling signal containing said user's address, said user station for transmitting a field intensity signal containing the stored field intensities and identifiers of the surrounding base stations to one of the surrounding base stations;

a management center connected to said public switched telephone network for transmitting said polling signal through a switched connection established by said public switched telephone network; and a radio central station for covering an area containing said microcells, the radio central station being connected to said public switched telephone network for receiving said polling signal via said switched connection from said management center and broadcasting a copy of the polling signal within said area, said radio central station serving as a transmitting station of a radio paging system for transmitting said polling signal and a radio paging signal having a message for radio pagers owned by subscribers of the radio paging system, each of said base stations receiving the field intensity signal transmitted from said user station and being responsive to said polling signal for notifying the field intensities and the identifiers contained in the field intensity signal to said management center through a switched connection established by said public switched telephone network, said management center determining the location of said user station from the field intensities and the identifiers notified by the base station.

5. A person location system as claimed in claim 4, wherein each of said base stations comprises means responsive to said polling signal supplied from said central station for broadcasting a copy of the polling signal.

6. A person location system as claimed in claim 5, wherein said field intensity signal additionally contains the address of the user station.

7. A location system as claimed in claim 5, wherein each of said base stations serves mobile telephone units.

* * * * *